(12) United States Patent
Kawashima

(10) Patent No.: US 9,607,164 B2
(45) Date of Patent: Mar. 28, 2017

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Yasuaki Kawashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 14/482,491

(22) Filed: Sep. 10, 2014

(65) Prior Publication Data

US 2015/0096047 A1   Apr. 2, 2015

(30) Foreign Application Priority Data

Oct. 1, 2013   (JP) ................... 2013-206809
Feb. 18, 2014  (JP) ................... 2014-028964

(51) Int. Cl.

| G06F 21/62 | (2013.01) |
| H04L 12/58 | (2006.01) |
| H04L 29/06 | (2006.01) |

(52) U.S. Cl.
CPC .............. *G06F 21/62* (2013.01); *H04L 51/06* (2013.01); *H04L 63/0823* (2013.01); *H04L 63/166* (2013.01)

(58) Field of Classification Search
None
See application file for complete search history.

(56) References Cited

U.S. PATENT DOCUMENTS

| 7,269,733 B1* | 9/2007 | O'Toole, Jr. ........... G06Q 10/06 705/75 |
| 2009/0119575 A1* | 5/2009 | Velusamy ............. G06F 17/243 715/226 |
| 2011/0069356 A1 | 3/2011 | Yoshida ....................... 358/442 |

FOREIGN PATENT DOCUMENTS

JP   2011-071660 A   4/2011

\* cited by examiner

*Primary Examiner* — Kaveh Abrishamkar
(74) *Attorney, Agent, or Firm* — Fitzpatrick, Cella, Harper & Scinto

(57) ABSTRACT

A communication apparatus has an auto-complete function using an LDAP protocol. The apparatus inputs character information, and verifies a certificate of an LDAP server. The apparatus obtains, by the LDAP protocol, address information including the character information input by the input unit after verifying the certificate of the LDAP server.

11 Claims, 9 Drawing Sheets

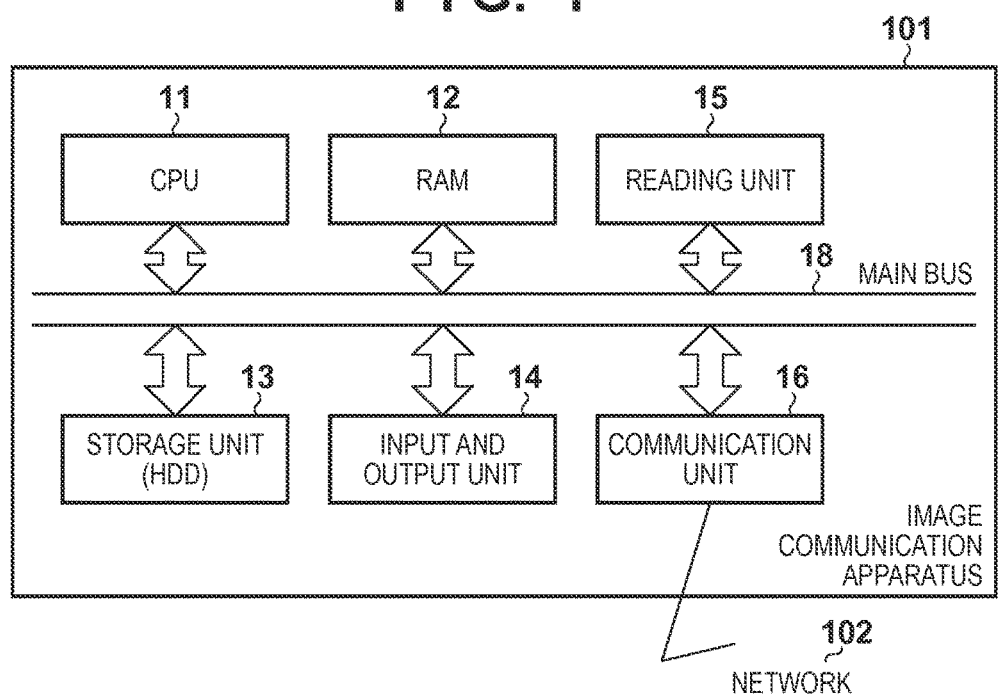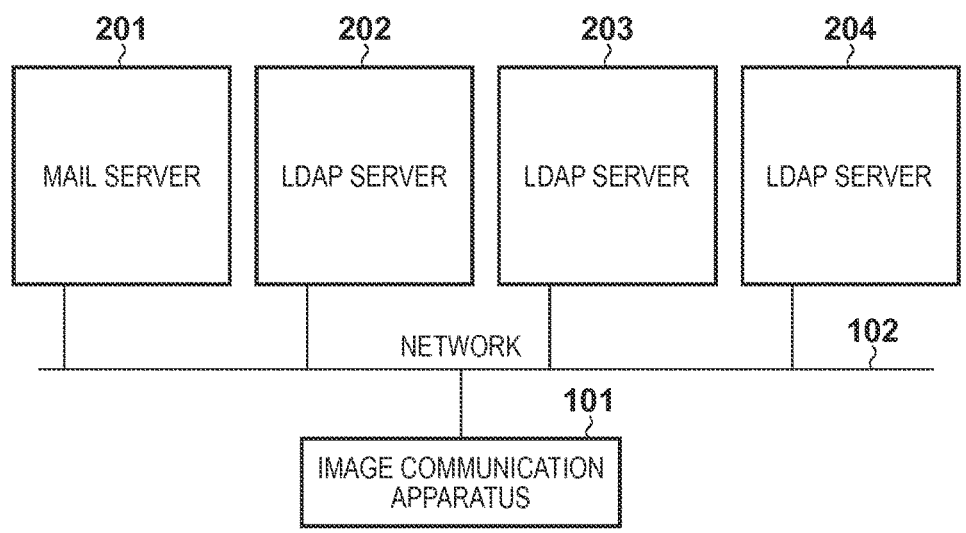

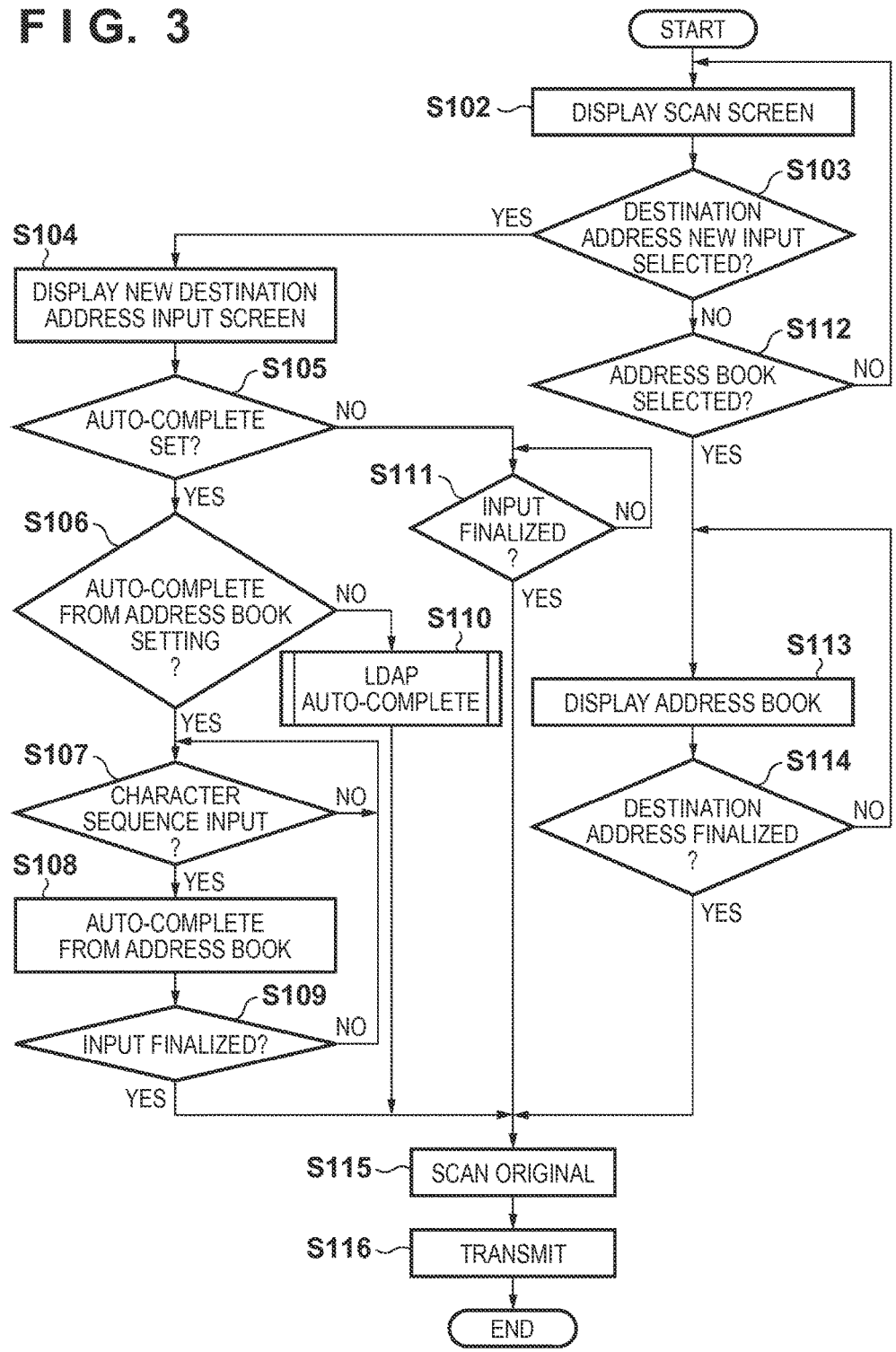

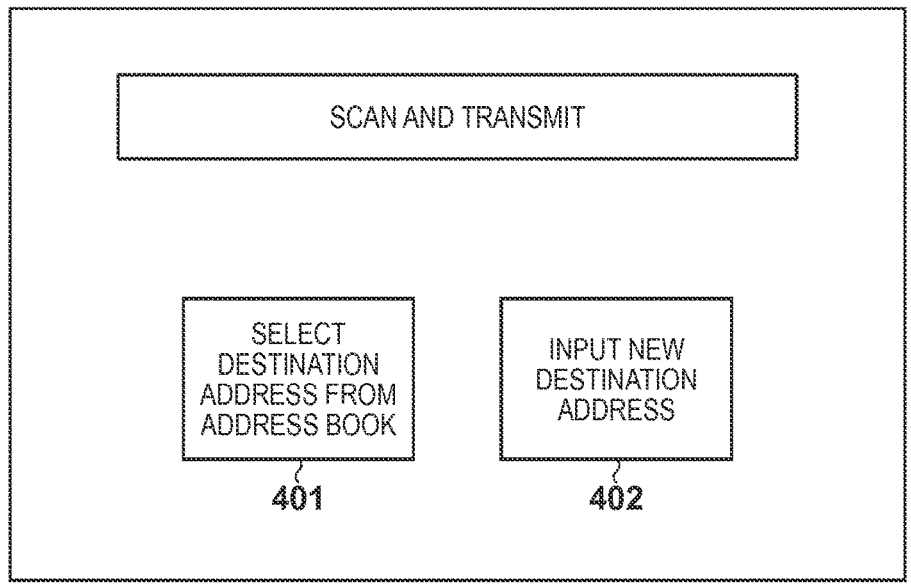
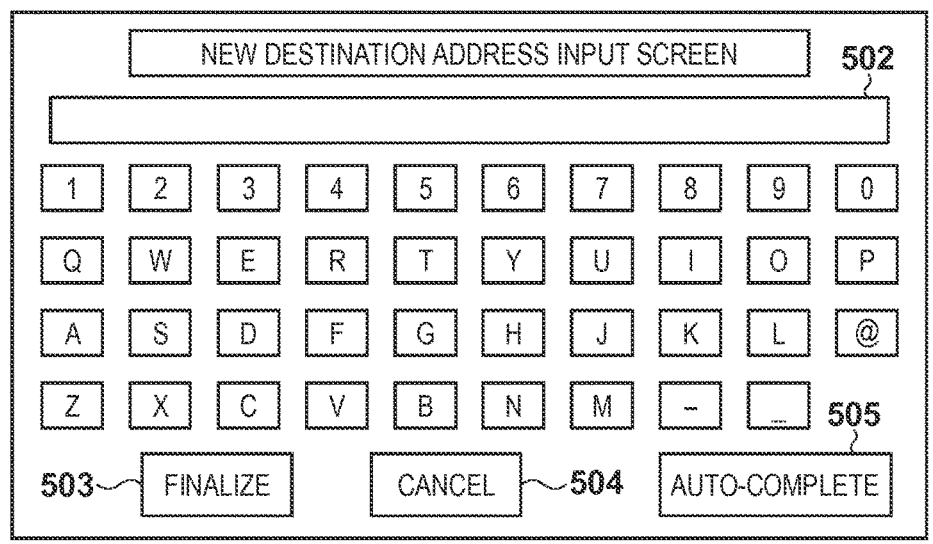

FIG. 9

| SERVERS FOR WHICH SSL CERTIFICATE VALIDITY COULD NOT BE VERIFIED |
|---|
| 1 |
| 2 |
| 3 |
| 4 |
| 5 |
| 6 |

FIG. 10

| ALREADY OBTAINED referral OBJECT LIST |
|---|
| 1 |
| 2 |
| 3 |
| 4 |
| 5 |
| 6 |

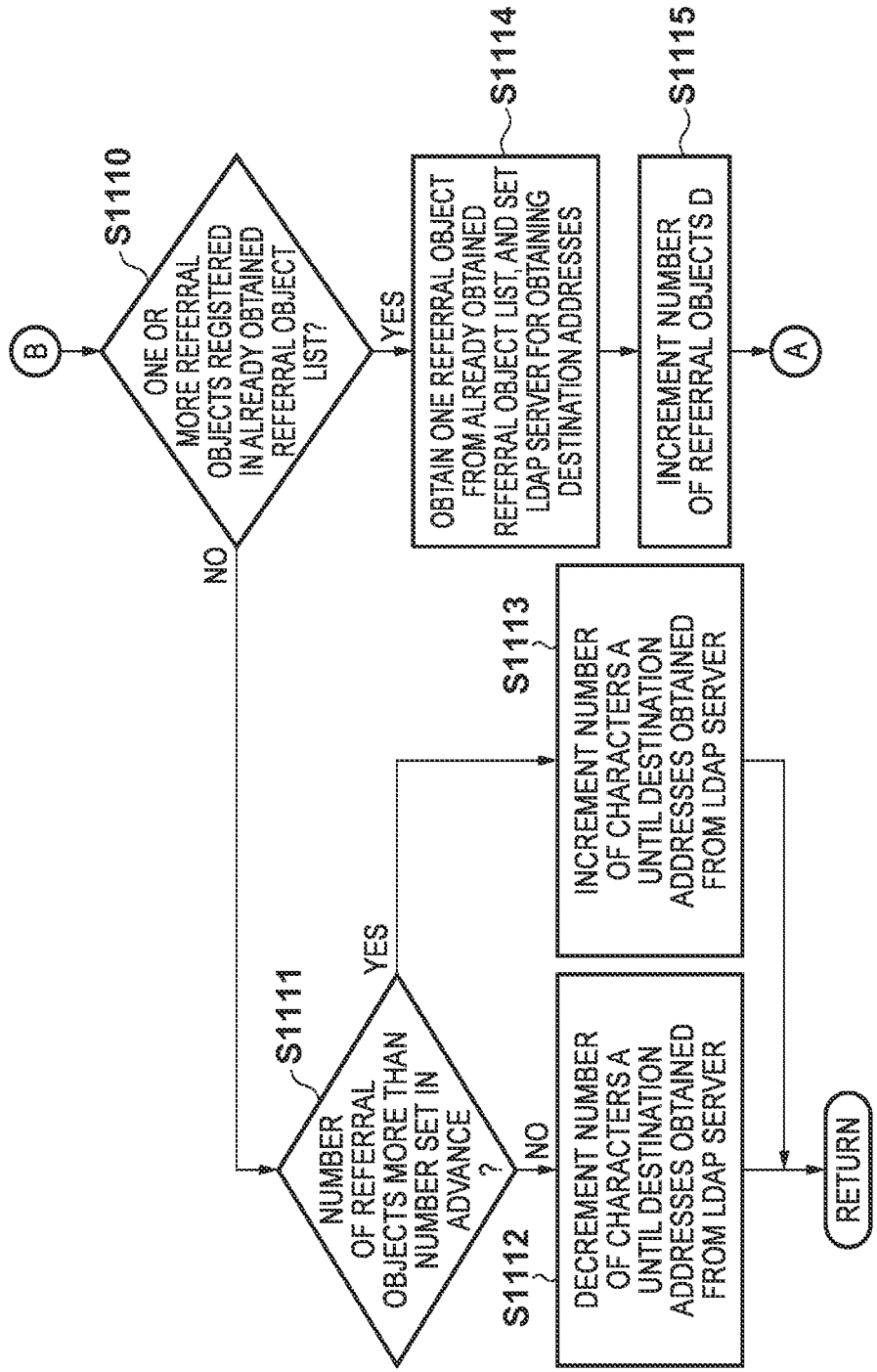

COMMUNICATION APPARATUS, METHOD OF CONTROLLING THE SAME, AND STORAGE MEDIUM

BACKGROUND OF THE INVENTION

Field of the Invention

The present invention relates to a communication apparatus having an auto-complete function, a method of controlling the same, and a storage medium.

Description of the Related Art

There are three approaches for specifying a destination address in a transmission of a mail, or the like, in conventional communications apparatuses. The first is an approach of selecting from destination addresses registered in an address book of the apparatus, and the second is an approach of inputting a destination address directly using a keyboard of an operation unit, or the like. Furthermore, the third approach is an approach (hereinafter referred to as an auto-complete) of combining a selection from registered destination address data and a selection of direct input by presenting destination address information of complementation candidates based on an input character sequence to a user when a destination address is directly input (Japanese Patent Laid-Open No. 2011-71660).

However, an approach of obtaining a destination address from an external device via a network using Lightweight Directory Access Protocol (hereinafter referred to as LDAP) as a way of obtaining the destination address is not mentioned in the prior art. There are cases in which a referral object, that introduces another server and is specific to the LDAP protocol, is processed in an approach of obtaining a destination address using the LDAP protocol. A referral object is an object that introduces a different LDAP server. When a client connected to the LDAP server receives a referral object from the LDAP server, it is necessary to connect to the LDAP server introduced by the referral object in order to further obtain a destination address. For this reason, there are cases where connections to a plurality of LDAP servers are needed for a single destination address search, so in order to obtain a destination address by connecting the plurality of LDAP servers, a large amount of time is required to complete the obtaining of the destination address and to complete the auto-complete. For this reason there is a problem in that convenience is reduced. In particular, this problem is noticeable in a case where settings are such that an LDAP server is connected to using the SSL protocol.

Also, while an approach of maintaining a connection to the server once connected to an LDAP server in order to shorten the time period required for the auto-complete to finish has been proposed, there is the possibility that a plurality of servers will be connected to due to a referral object being processed. Because there are restrictions to the number of LDAP servers to which a communication apparatus is able to connect to at a time, it is difficult to maintain all of the connections to the connected LDAP servers, and so the above described problem is not resolved.

SUMMARY OF THE INVENTION

An aspect of the present invention is to eliminate the above-mentioned problems with the conventional techniques.

A feature of the present invention is to provide a technique in which, even in a case where a destination address is obtained using an LDAP server, a processing delay due to an auto-complete function can be prevented.

According to an aspect of the present invention, there is provided a communication apparatus having an auto-complete function using an LDAP protocol, the apparatus comprising: an input unit configured to input character information; a verifying unit configured to verify a certificate of an LDAP server; and an obtaining unit configured to obtain, by the LDAP protocol, address information including the character information input by the input unit after the certificate of the LDAP server has been verified by the verifying unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram for explaining a hardware configuration of an image communication apparatus according to embodiments.

FIG. 2 is a view for illustrating an example configuration of a communication system containing the image communication apparatus according to the embodiment.

FIG. 3 is a flowchart for describing processing executed by a CPU of the image communication apparatus according to embodiments when a user inputs a destination address.

FIG. 4 is a view for illustrating an example of a scan screen according to embodiments.

FIG. 5 is a view for illustrating an example of an input screen for a new destination address according to embodiments.

FIG. 9 is a view for showing an example of a display screen for displaying a list of LDAP servers for which an SSL certificate could not be verified.

FIG. 10 is a view for showing an example of a display screen for displaying a list of already obtained referral objects.

FIGS. 11A to 11C are flowcharts for describing LDAP destination address obtaining processing in step S813 in FIG. 8.

DESCRIPTION OF THE EMBODIMENTS

Figure 6:
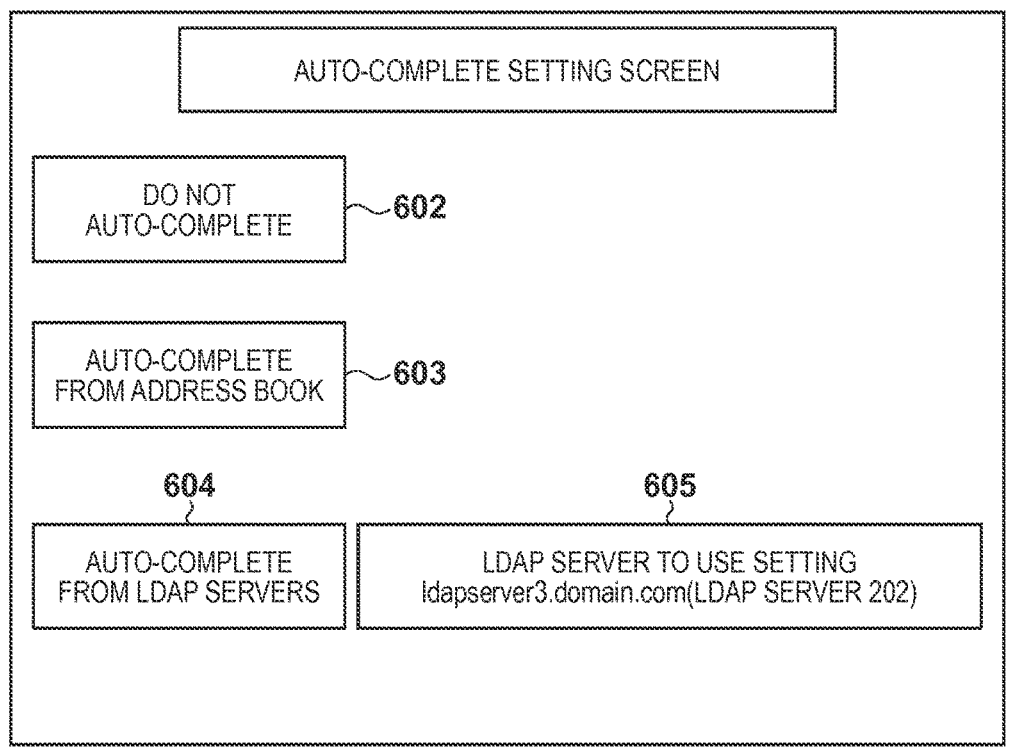
FIG. 6 is a view for illustrating an example of an auto-complete setting screen according to embodiments.

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

First, an overview of processing in an image communication apparatus according to the embodiment is explained.

In an auto-complete function according to embodiments, with each user input of character information indicating a destination address into the image communication apparatus, complementation candidate destination addresses are obtained and the obtained destination addresses are displayed complementing the user input.

A flow for obtaining destination address information from an LDAP server is explained hereinafter. A connection to an LDAP server is made using an SSL or a TCP protocol, and a destination address search request is transmitted, to the LDAP server to which the connection is made, using an LDAP protocol. In a case where the connection to the LDAP server is made using the SSL protocol, verification of an SSL certificate of the LDAP server is performed, and the connection will be stopped if the validity of the LDAP server cannot be verified. After the destination address search request is transmitted to the LDAP server, the destination address is obtained from the LDAP server, and it is determined whether or not a referral object is included in the obtained destination address. A referral object is an object by which the LDAP server that received the search request introduces a different LDAP server. Therefore, in order to obtain the destination address for a complementation candidate, a connection, to the LDAP server that the obtained referral object introduces, must be made using the SSL protocol or the TCP protocol, and a destination address search must be performed. By repeating the operation of referencing these kinds of referral objects and connecting to different LDAP servers, the required number of complementation candidates are obtained.

FIG. 1 is a block diagram for explaining a hardware configuration of an image communication apparatus 101 according to the embodiment.

The image communication apparatus 101 comprises a CPU 11, a RAM 12, a storage unit 13, an input and output unit 14, a reading unit 15 and a communication unit 16, and these are connected to each other via a main bus 18. The CPU 11 controls the image communication apparatus 101 in accordance with programs stored in the storage unit 13 and loaded into the RAM 12 upon execution. The RAM 12 provides a work area when the CPU 11 executes processing. The storage unit 13 is a storage unit (hereinafter referred to as an HDD) such as a hard disk drive (an NVRAM) storing programs executed by the CPU 11, a variety of settings, and files, or the like. The input and output unit 14 is used in a case where a user inputs a command, or where a message to a user is displayed, and a user performs variety of settings through a GUI (Graphical User Interface). The input and output unit 14 may comprise a touch panel function. The reading unit 15 scans an original, such as a document, optically, and generates digital data of the original image. The communication unit 16 controls communication with external devices via a network 102.

Note, in the image communication apparatus 101 according to the embodiments, while there is no particular limitation to this, the CPU 11 controls the RAM 12, the HDD 13, the input and output unit 14, the reading unit 15, and the communication unit 16 via the main bus 18, and executes processing according to embodiments. In the HDD 13, a plurality of destination address information items, relating to transmission destinations to which the image communication apparatus 101 is able to transmit image data, are stored, and these destination address information items can be displayed by the input and output unit 14. Hereinafter, destination address information registered in the HDD 13 is referred to as an address book.

FIG. 2 is a view for illustrating an example configuration of a communication system containing the image communication apparatus 101 according to the embodiment.

Here the image communication apparatus 101 is connected to an LDAP server 202, an LDAP server 203 and an LDAP server 204 via the network 102. The image communication apparatus 101 is able to connect to the LDAP server 202, the LDAP server 203, and the LDAP server 204 using the LDAP protocol. The image communication apparatus 101 is also connected to a mail server 201 via the network 102, and can transmit image data to a mail address registered for the mail server 201.

FIG. 3 is a flowchart for describing processing executed by the CPU 11 of the image communication apparatus 101 according to embodiments when a user inputs a destination address. Note that the processing shown by this flowchart is realized by a program for executing the processing shown in this flowchart being installed in the HDD 13, the program being loaded into the RAM 12, and the loaded program being executed by the CPU 11.

The processing is initiated, for example, by an instruction to scan and transmit an original being input into the input and output unit 14, and firstly, the CPU 11 displays a scan screen, for example, as shown in FIG. 4, in the input and output unit 14 in step S102.

FIG. 4 is a view for illustrating an example of a scan screen according to embodiments.

In FIG. 4, a button 401 is a button making an instruction to select a destination address from an address book. A button 402 is a button for making an instruction to input a destination address using, for example, a keyboard.

After displaying the scan screen, the processing proceeds to step S103 where the CPU 11 determines whether or not the button 402 for newly inputting a destination address is pressed. When it is determined that the button 402 is pressed, the processing proceeds to step S104, and the CPU 11 displays a new destination address input screen, as shown in FIG. 5, in the input and output unit 14.

FIG. 5 is a view for illustrating an example of the new destination address input screen according to embodiments.

A software keyboard is displayed in the input and output unit 14 as shown in FIG. 5, and a telephone number or a mail address, or the like, of a destination address can be input using numeric keys or alphabet character keys of the software keyboard. A display area 502 is an area for displaying an input character sequence and a destination address, or the like, from an address book or an LDAP server that was searched. A finalization key 503 is a key for confirming a destination address that was input or searched, and a cancel key 504 is a key for cancelling input content. When an auto-complete key 505 is pressed, the processing transitions to an auto-complete setting screen shown in FIG. 6.

Here, for example, when the auto-complete key 505 is pressed in the new destination address screen of in FIG. 5, the processing transitions to the screen shown in FIG. 6.

FIG. 6 is a view for illustrating an example of an auto-complete setting screen according to embodiments.

In FIG. 6, pressing a button 602 is for configuring so that auto-complete is not performed. A button 603 is for designation that auto-complete be performed, and the button 603 is for configuring so that auto-complete is performed based on a address book registered in HDD 13. A button 604 is for designation that auto-complete be performed, and the button 604 is for setting so that auto-complete be performed with LDAP servers connected via the network 102. A button 605 is for designating an LDAP server to use when auto-complete is performed with the LDAP server connected via the network 102.

In step S105, the CPU 11 determines whether or not setting is such that auto-complete is to be performed (the button 602 not being pressed), and the processing proceeds to step S106 if setting is such that auto-complete is performed, and otherwise the processing proceeds to step S111. In step S106, the CPU 11 determines whether either of the button 603 or the button 604 in FIG. 6 is instructed. In a case where it is determined that setting is such that auto-complete is performed based on an address book in step S106, the processing proceeds to step S107, and the CPU 11 determines whether a character sequence is input by the numeric keys or the alphabet character keys in the screen in FIG. 5. Here if a character sequence is input, the processing proceeds to step S108, and the CPU 11 searches for a destination address which is begins-with matching with the input character sequence in the address book in the HDD 13, and displays a result of the search in the display area 502 in FIG. 5. Note, in a case where the CPU 11 determines that a character sequence is not input in step S107, the processing returns to step S107 and the processing is continued. After the result of the search is displayed in the display area 502 in FIG. 5 in step S108, the processing proceeds to step S109, the CPU 11 determines whether or not a finalization key 503 is pressed, and the processing proceeds to step S115 in a case where the finalization key 503 is pressed, and otherwise the processing proceeds to step S107. In step S115, the CPU 11 generates image data for transmitting by scanning an original using the reading unit 15. Then the processing proceeds to step S116, the CPU 11 transmits the image data generated in step S115 to the address finalized in step S109 using the communication unit 16.

On the other hand, in a case where the button 604 in FIG. 6 is pressed and setting is such that auto-complete is performed with LDAP servers in step S106, the processing proceeds to step S110, the CPU 11 executes LDAP auto-complete processing which is explained later, the processing proceeds to step S115, and the previously described processing is executed.

Also in a case where the CPU 11 determines that setting is such that auto-complete is not performed in step S105, the processing proceeds to step S111, and the CPU 11 determines whether or not an input of the destination address is completed and the finalization key 503 in FIG. 5 is pressed. Here in a case where it is determined that the finalization key 503 is pressed, the processing proceeds to step S115 and the previously described processing is executed by the CPU 11.

Also in a case where the CPU 11 determines that the button 402 for newly inputting a destination address is not pressed in step S103, the processing proceeds to step S112 and the CPU 11 determines whether searching for destination addresses from an address book is selected by the button 401. In a case where it is determined that searching for destination addresses from an address book is selected in step S112, the processing proceeds to step S113 where the CPU 11 displays the address book in the input and output unit 14, and the processing proceeds to step S114. The CPU 11 determines whether or not a destination address is instructed with the displayed address book in step S114, and the processing proceeds to step S115 in a case where a destination address is instructed, and otherwise the processing returns to step S113.

Figure 7:
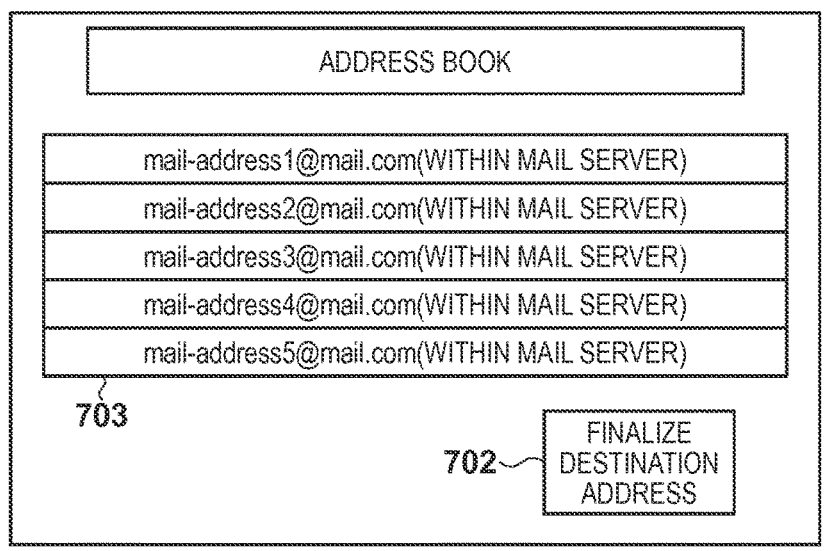
FIG. 7 is a view for showing an example of a screen where an address book displayed on an input and output unit in step S113 is displayed.

FIG. 7 is a view for showing an example of a screen where an address book displayed on the input and output unit 14 in step S113 is displayed.

For example, in FIG. 7, when a destination address 703 is selected and a destination address finalization button 702 is pressed, selection of the destination address is finalized as the destination address 703 in FIG. 7. With this, the CPU 11 moves the processing from step S113 to step S114.

As explained above, according to the flowchart in FIG. 3, when a destination address is newly input, it is possible to designate auto-complete and select whether auto-complete is performed with an address book stored on the image communication apparatus or whether auto-complete is performed by the LDAP server via the network. Note, specifying a destination address by referencing an address book when not inputting a new destination address, and the operation of inputting a new destination address without using auto-complete are known techniques.

Figure 8:
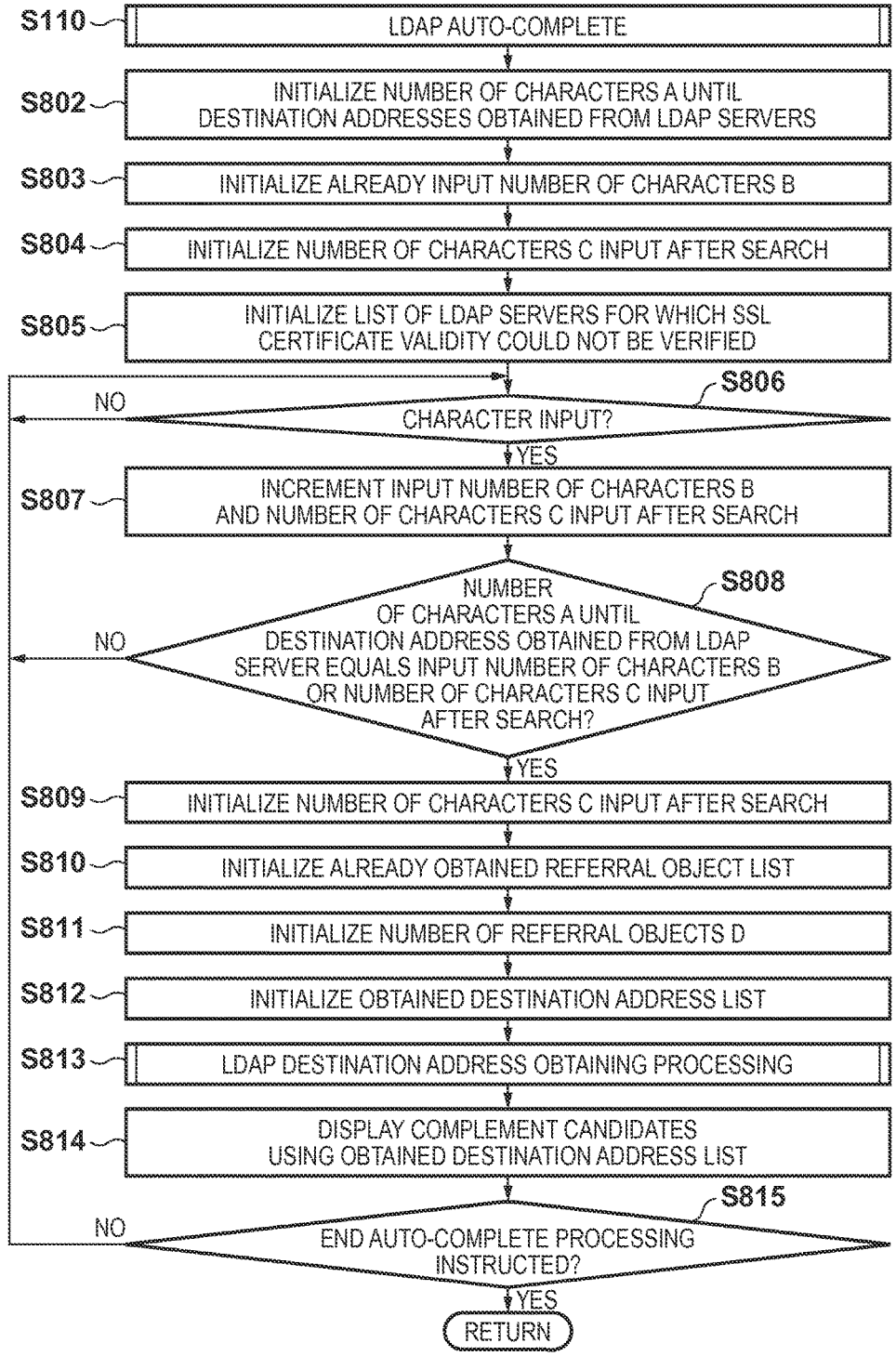
FIG. 8 is a flowchart for describing LDAP auto-complete processing in step S110 in FIG. 3.

FIG. 8 is a flowchart for describing LDAP auto-complete processing in step S110 in FIG. 3.

Firstly, in step S802, the CPU 11 initializes the number of characters A to be entered before destination addresses are obtained from LDAP servers. In this embodiment, explanation is given with the number of characters A to be entered before destination addresses are obtained from LDAP servers being "1" as an initial state, but other values may be taken. Next, the processing proceeds to step S803, and the CPU 11 initializes the already input number of characters B. Here, explanation is given with the already input number of characters B being "0" as an initial state, but other values may be taken. Next, the processing proceeds to step S804, and the CPU 11 initializes the number of characters C input after search. Explanation is given with the number of characters C input after search being "0" as an initial state, but other values may be taken. Next, the processing proceeds to step S805, and the CPU 11 initializes a list of LDAP servers, one example of which is shown in FIG. 9, for which an SSL certificate could not be verified.

FIG. 9 is a view for showing an example of a display screen for displaying a list of LDAP servers for which an SSL certificate could not be verified.

Next, the processing proceeds to step S806, and the CPU 11 determines whether or not a user of the image communication apparatus 101 input a character in the display area 502 in the screen in FIG. 5. In a case where no character is input, the processing returns to step S806, and the processing is continued. In a case where the CPU 11 determines that a character is input in step S806, the processing proceeds to step S807, the CPU 11 increments the already input number of characters B, and the number of characters C input after search, if it is after a search. Firstly, when incrementing in step S807, the already input number of characters B becomes "1", because the already input number of characters B is initialized to "0" in step S803. Next, the processing proceeds to step S808, and the CPU 11 determines whether or not the already input number of characters B is same as the number of characters A to be entered before destination addresses are obtained from LDAP servers. In this embodiment, the number of characters B matches the number of characters A, because the already input number of characters B is incremented to "1" in step S807 and the number of characters A to be entered before destination addresses are obtained from the LDAP server is initialized to "1" in step S802. If the number of characters B does not match the number of characters A, the processing returns to step S806 and the processing continues, and the processing proceeds to step S809 if the number of characters B matches the number of characters A. The CPU 11 initializes the number of characters C input after search to "0" in step S809.

Next the processing proceeds to step S810, the CPU 11 initializes a list of the already obtained referral objects shown in FIG. 10, and initializes the number of referral objects D in step S811. After that, the processing proceeds to step S812, the CPU 11 initializes the obtained destination address list, the processing proceeds to step S813, and the CPU 11 performs the LDAP destination address obtaining processing. The LDAP destination address obtaining processing will be explained later.

FIG. 10 is a view for showing an example of a display screen for displaying a list of already obtained referral objects.

Next the processing proceeds to step S814, the CPU 11 displays the destination address list obtained in the processing in step S813 on the new destination address input screen, to a user of the image communication apparatus 101, and displays in the display area 502 complementing input. Next the processing proceeds to step S815, the CPU 11 determines whether or not the finalization key 503 or the cancel key 504 is pressed on the screen displayed in step S814, and the completion of the auto-complete processing is instructed. In a case where the completion is instructed, the flow ends, but if completion is not instructed, the processing returns to step S806, and the previously described processing is continued.

Figure 11A:
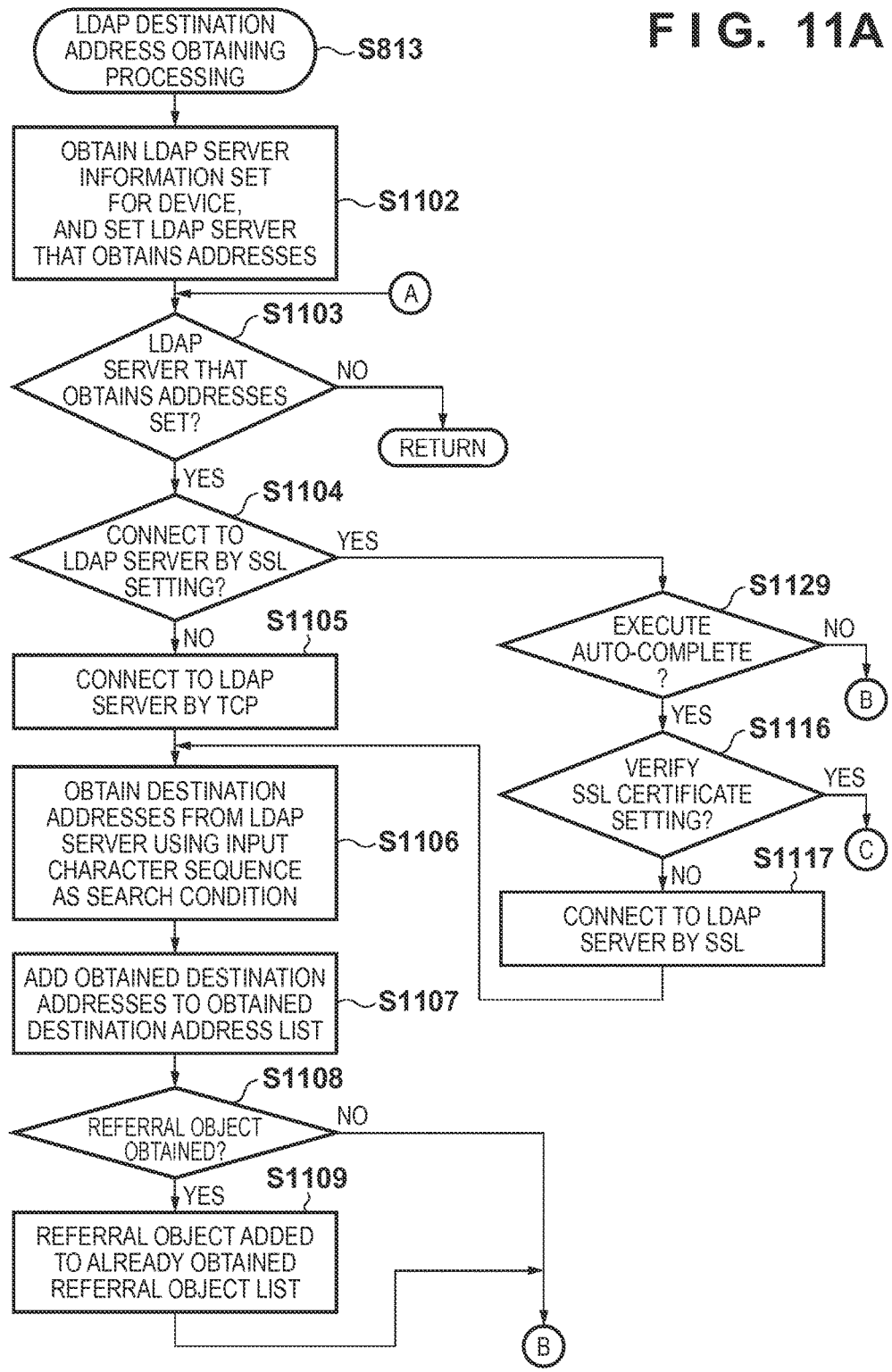
Figure 11B:
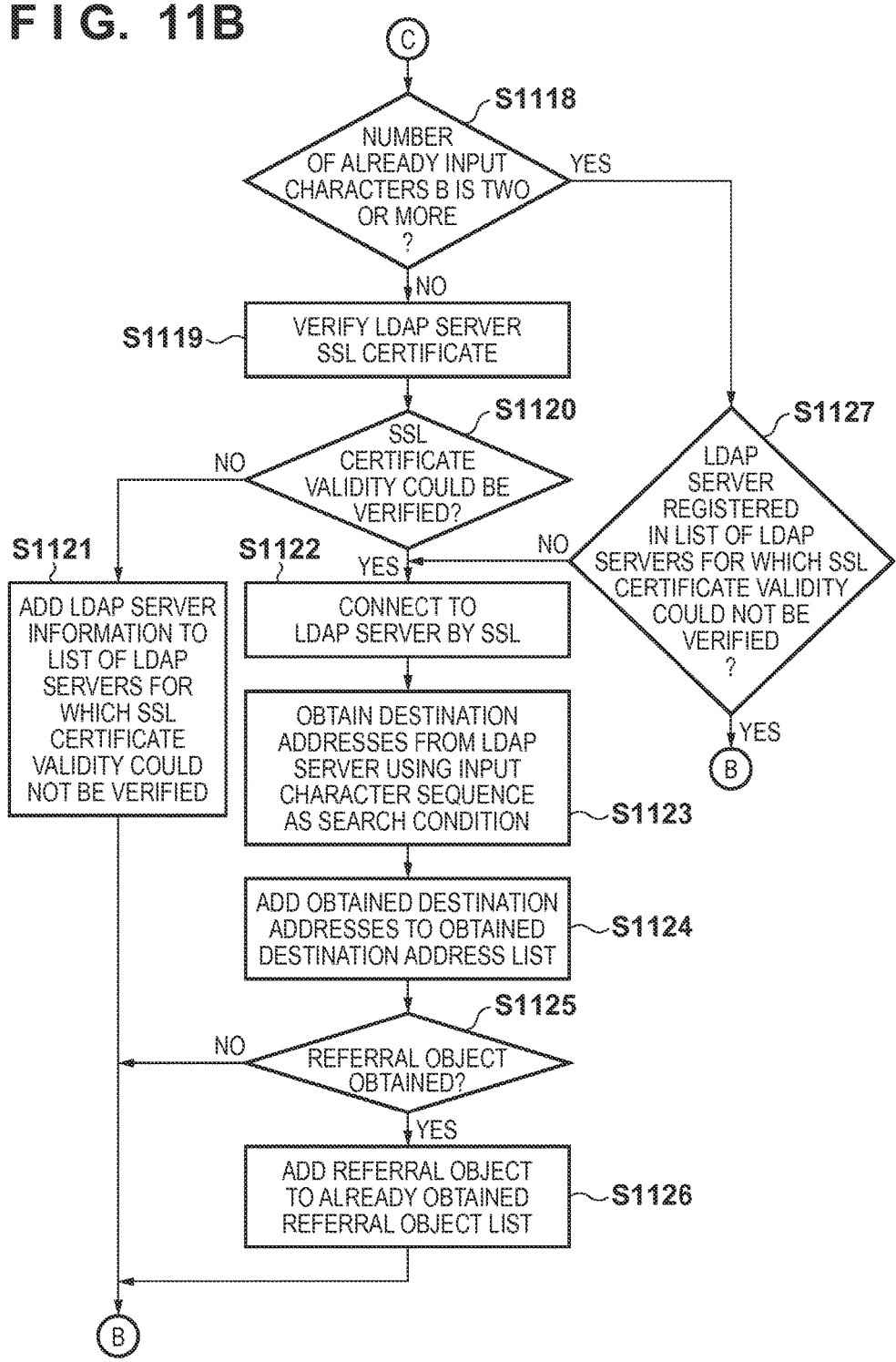

FIGS. 11A to 11C are flowcharts for describing the destination address obtaining processing of an LDAP auto-complete in step S813 in FIG. 8.

First, the CPU 11, in step S1102, obtains LDAP server information designated with the button 605 of FIG. 6, for example, the processing proceeds to step S1103, and the CPU 11 determines whether or not information of the LDAP server could be obtained. Here, when it is determined that information of the LDAP server could not be obtained, the flow ends, and in a case where it is determined that information of the LDAP server could be obtained, that LDAP server is set as the LDAP server that obtains the destination addresses, and the processing proceeds to step S1104. In step S1104, the CPU 11 determines whether or not setting is such that connection to that LDAP server is made using the Secure Socket Layer protocol (hereinafter referred to as the SSL protocol). If setting is such that connection to that LDAP server is made using the SSL protocol, the processing proceeds to step S1129, and in a case where setting is such that connection to that LDAP server is not made using the SSL protocol, the processing proceeds to step S1105 and the CPU 11 connects to the LDAP server obtained in step S1102 using the TCP protocol. After connecting to the LDAP server in this way, the processing proceeds to step S1106, the CPU 11 obtains the destination address information by requesting of the LDAP server destination addresses that are begins-with matches with the character sequence input on the new destination address input screen shown in FIG. 5. Then, the processing proceeds to step S1107, and the CPU 11 adds the destination address information obtained in step S1106 to the already obtained destination address list. Then, the processing proceeds to step S1108, and the CPU 11 determines whether or not a referral object, that introduces going to search on a differing LDAP server defined in LDAP in the destination address information obtained in step S1106, is included. Here, when it is determined that the referral object is included, the processing proceeds to step S1109, the CPU 11 adds the referral object to the already obtained referral object list, and the processing proceeds to step S1110.

On the other hand, in a case where it is determined that a referral object is not included in step S1108, the processing proceeds to step S1110. In step S1110, the CPU 11 determines whether or not one or more referral objects are registered in the list of already obtained referral objects. In a case where one or more referral objects are not registered, the processing proceeds to step S1111, and the CPU 11 determines whether or not the number of referral objects is larger than the number set in advance. Here, when it is determined that the number of referral objects is smaller than the number set in advance, the processing proceeds to step S1112, and the CPU 11 decrements the number of characters A until destination addresses are obtained from the LDAP server, and the processing completes. On the other hand, when it is determined that the number of referral objects is larger than the number set in advance, the processing proceeds to step S1113, and increments the number of characters A until destination addresses are obtained from the LDAP server, and the processing completes.

With this, when the number of referral objects introducing going to search on differing LDAP servers is less than the number set in advance, the number of characters in begins-with matching for which searching is performed is reduced, and the number of times auto-complete is performed is increased. Conversely, when the number of referral objects is more than the number set in advance, the number of characters in begins-with matching for which searching is performed is increased, and the number of times auto-complete is performed is reduced.

Also, in a case where the CPU 11 determines, in step S1110, that one or more referral objects are registered, the processing proceeds to step S1114, and the CPU 11 retrieves one referral object from the list of already obtained referral objects. Then, the CPU 11 sets that referral object to be the LDAP server for obtaining the destination addresses. After this, the processing proceeds to step S1115, the CPU 11 increments the number of referral objects D, the processing returns to step S1103, and the processing continues.

Also, in a case where the CPU 11, in step S1104, determines that setting is such that connection to that LDAP server is by the SSL protocol, the processing proceeds to step S1129. Even in a case where setting is such that connection is made using the SSL protocol for the LDAP server, the CPU 11, in step S1129, determines whether or not setting is such that auto-complete is executed. When the CPU 11 determines, in step S1129, that setting is such that auto-complete is not executed, the processing proceeds to step S1110, and the processing continues. Meanwhile, in a case where the CPU 11, in step S1129, determines that setting is such that auto-complete is executed, the processing proceeds to step S1116, and the CPU 11 determines whether or not setting is such that an SSL certificate is verified. In a case where it is determined that setting is such that an SSL certificate is not verified, the processing proceeds to step S1117, the CPU 11 connects to the LDAP server by the SSL protocol, the processing proceeds to step S1106, and the previously described processing is executed.

On the other hand, in a case where setting is such that an SSL certificate is verified in step S1116, the processing proceeds to step S1118, and the CPU 11 determines whether or not the number of characters B input into the auto-complete screen is two or more. In a case where it is determined that the number of characters B input into the auto-complete screen is not two characters or more, the processing proceeds to step S1119, and the CPU 11 performs verification of the SSL certificate of the LDAP server. Then, the processing proceeds to step S1120, and the CPU 11 determines whether or not a validity of the LDAP server could be verified with the SSL certificate. There are various determination criteria for whether or not the validity of the LDAP server could be verified using the SSL certificate such as whether the current time is within a validity time of the certificate, or whether the certificate is not defined in an expired list, and any kind of determination criteria may be used in embodiments. In step S1120, in a case where the CPU 11 determines that the validity cannot be verified, the processing proceeds to step S1121, the LDAP server is added to a list of servers for which the SSL certificate could not be verified, and the processing proceeds to step S1110.

Meanwhile, in a case where the validity could be verified in step S1120, the processing proceeds to step S1122, and the CPU 11 connects to the LDAP server using the SSL protocol. Then the processing proceeds to step S1123, and the CPU 11 obtains destination addresses by making a request to the LDAP server for the destination addresses that are begins-with matches with the character sequence input on the auto-complete screen. Then, the processing proceeds to step S1124, the CPU 11 adds the destination address obtained in step S1123 to the obtained destination address list, and the processing proceeds to step S1125. In step S1125, the CPU 11 determines whether or not a referral object is included in the destination address list obtained in step S1123, and in a case where a referral object is not included, the processing proceeds to step S1110, and the processing continues. Meanwhile, in a case where it is determined that a referral object is included in step S1125, the processing proceeds to step S1126, and the CPU 11 adds the included referral object to the already obtained object list, the processing proceeds to step S1110, and the processing continues.

Also, in a case where the CPU 11, in step S1118, determines that the input number of character B is equal to or larger than two characters, the processing proceeds to step S1127, and the CPU 11 determines whether or not that LDAP server is registered in the list of servers for which validity could not be verified with the SSL certificate. In a case where it is determined that the LDAP server is not registered, the processing proceeds to step S1122, and in a case where it is determined that the LDAP server is registered, the processing proceeds to step S1110, and the processing continues.

As explained above, according to the present embodiment, in a case where it is expected that communication will occur multiple times over a short period such as with LDAP auto-complete, a deterioration in response speed can be prevented by configuring so as to not perform verification of an SSL certificate for every communication.

Also, by registering a list of LDAP servers for which validity could not be verified by SSL certificate verification, an LDAP auto-complete using those registered server can be prevented.

Also, LDAP server SSL certificate verification is skipped when the input number of characters is greater than or equal to a predetermined number (for example, greater than or equal to two), but LDAP server verification with an SSL certificate is performed when the input number of characters is less than the predetermined number (for example, less than two). Because of this, the time for LDAP auto-complete can be shortened.

Furthermore, when the number of referral objects that introduce a server other than the obtaining target LDAP server is more than a predetermined number, the frequency of searching with LDAP auto-complete is reduced by changing the number of characters for which to do a search. With this, the processing time in LDAP auto-complete becoming longer can be prevented.

Also, in a case where the number of LDAP servers to connect to with referral objects is a number for which maintaining sessions is not a problem, sessions with the plurality of LDAP servers are kept alive. Because of this, the processing time for LDAP auto-complete can be shortened.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206809, filed Oct. 1, 2013 and Japanese Patent Application No. 2014-028964, filed Feb. 18, 2014, which are hereby incorporated by reference herein in their entirety.

What is claimed is:

1. A communication apparatus having an auto-complete function using an LDAP protocol, the apparatus comprising:
   an input unit configured to input character information;
   a verifying unit configured to verify a certificate of an LDAP server; and
   an obtaining unit configured to obtain, from the LDAP server by the LDAP protocol after the certificate of the LDAP server has been verified by the verifying unit, address information including the character information input by the input unit.

2. The communication apparatus according to claim 1, further comprising a control unit configured to control so as to, in a case where a number of the character information input by the input unit is less than a predetermined number, cause the obtaining unit to obtain the address information from the LDAP server by the LDAP protocol after the certificate of the LDAP server has been verified by the verifying unit, and in a case where the number of the character information input by the input unit is greater than or equal to the predetermined number, cause the obtaining unit to obtain the address information from the LDAP server by the LDAP protocol without performance of verification by the verifying unit.

3. The communication apparatus according to claim 2, wherein the predetermined number is 2.

4. The communication apparatus according to claim 1, wherein the obtaining unit is configured to obtain the address information from the LDAP server, the certificate of which has been verified by the verifying unit.

5. The communication apparatus according to claim 1, further comprising a designation unit configured to designate whether the address information is obtained from the LDAP server or the address information is obtained from a stored address book.

6. The communication apparatus according to claim 1, further comprising
a storage unit configured to store a list of LDAP servers, the certificates of which are not verified by the verifying unit, and
a control unit configured to control so that the obtaining unit does not obtain address information from an LDAP server of the list stored in the storage unit.

7. The communication apparatus according to claim 1, wherein
the obtaining unit is configured to obtain, from the LDAP server by the LDAP protocol, the address information when a number of the character information input by the input unit becomes a predetermined number, and
the communication apparatus further comprises
a modification unit configured to modify the predetermined number in accordance with a number of referral objects that introduce servers other than the LDAP server and that the obtaining unit obtains.

8. The communication apparatus according to claim 7, wherein the modification unit is configured to, in a case where the number of referral objects is lower than a number determined in advance, reduce the predetermined number.

9. The communication apparatus according to claim 1, further comprising:
a reading unit configured to read a document and generate image data; and
a transmitting unit configured to transmit the image data based on the address information obtained by the obtaining unit.

10. A method of controlling a communication apparatus having an auto-complete function using an LDAP protocol, the method comprising:
inputting character information;
verifying a certificate of an LDAP server; and
obtaining, from the LDAP server by the LDAP protocol after the certificate of the LDAP server has been verified, address information including the character information input in the inputting.

11. A non-transitory computer-readable storage medium storing a program for causing a computer to
input character information;
verify a certificate of an LDAP server; and
obtain, from the LDAP server by the LDAP protocol after the certificate of the LDAP server has been verified, address information including the character information input in the inputting.

* * * * *